United States Patent [19]
Oliver

[11] Patent Number: 5,349,343
[45] Date of Patent: * Sep. 20, 1994

[54] FLEXIBLE MODULE INTERCONNECT SYSTEM

[75] Inventor: Christopher J. Oliver, Rochester, N.H.

[73] Assignee: Cabletron Systems, Inc., Rochester, N.H.

[ * ] Notice: The portion of the term of this patent subsequent to May 19, 2009 has been disclaimed.

[21] Appl. No.: 871,827

[22] Filed: Apr. 21, 1992

Related U.S. Application Data

[63] Continuation of Ser. No. 412,091, Sep. 25, 1989, Pat. No. 5,115,235.

[51] Int. Cl.$^5$ .............................................. H04Q 1/00
[52] U.S. Cl. ......................... 340/825.52; 340/825.05; 340/825.08
[58] Field of Search ........................ 340/825.52, 825.05, 340/825.06, 825.08, 825.03, 825.04, 825.8; 370/16, 16.1, 85.7, 67, 85.13, 85.1, 110.1; 361/392, 393, 395, 412; 307/112, 113; 371/11.1, 11.2, 11.3

[56] References Cited

U.S. PATENT DOCUMENTS

| | | | |
|---|---|---|---|
| 3,800,097 | 3/1974 | Maruscak et al. | |
| 4,214,302 | 7/1980 | Schmidt | 364/200 |
| 4,490,775 | 12/1984 | Quan | 361/406 |
| 4,504,821 | 3/1985 | Barnes | 340/146.2 |
| 4,514,786 | 4/1985 | Charruau | 361/413 |
| 4,520,429 | 5/1985 | Hosking | 361/413 |
| 4,633,245 | 12/1986 | Blount et al. | 340/825.03 |
| 4,633,431 | 12/1986 | Bar | 364/900 |
| 4,647,123 | 3/1987 | Chin et al. | 339/17 |
| 4,658,333 | 4/1987 | Grimes | 361/413 |
| 4,700,274 | 10/1987 | Laut | 361/393 |
| 4,701,878 | 10/1987 | Gunkel et al. | 364/900 |
| 4,707,834 | 11/1987 | Frisch et al. | 371/20 |
| 4,710,915 | 12/1987 | Kitahara | 370/16.1 |
| 4,742,433 | 5/1988 | Joly et al. | 361/412 |
| 4,764,868 | 8/1988 | Ketelhut et al. | 364/200 |
| 4,800,462 | 1/1989 | Zacher et al. | 361/413 |
| 4,829,297 | 5/1989 | Ilg et al. | 340/825.08 |

FOREIGN PATENT DOCUMENTS

| | | |
|---|---|---|
| 0117954 | 9/1984 | European Pat. Off. . |
| 0226765 | 7/1987 | European Pat. Off. . |
| 2597688 | 10/1987 | France . |

OTHER PUBLICATIONS

IBM Tech. Discl. Bull., vol. 25, No. 4, Sep. 1982, pp. 1989–1990, B. W. Lee et al.
IMB Tech. Discl. Bull., vol. 16, No. 6, Nov. 1973, pp. 1855–1856, A. R. Blum et al.

*Primary Examiner*—Donald J. Yusko
*Assistant Examiner*—Edwin C. Holloway, III
*Attorney, Agent, or Firm*—Wolf, Greenfield & Sacks

[57] ABSTRACT

A flexible modular interconnect system is provided which utilizes a backplane having a plurality of module receiving slots and a plurality of circuit modules, selected ones of the circuit modules being mounted in at least selected ones of the slots. The modules may be of a variety of different types. First and second switches are provided for each circuit module with selected lines from module logic being connected to each of the switches. The first and second switches for each module are interconnected and the first switch for the selected modules are connected to the switch for adjacent modules. Selected information concerning each module is provided to each adjacent module and control logic is provided which is responsive at least in part to the received information concerning the adjacent module for controlling the state of an appropriate switches. The switches may also be controlled from an external source. By selectively controlling the state of the switches, the modules may be flexibly interconnected.

21 Claims, 5 Drawing Sheets

FLEXIBLE MODULE INTERCONNECT SYSTEM

This application is a continuation of application Ser. No. 07/412,091, filed Sep. 25, 1989, now U.S. Pat. No. 5,115,235.

BACKGROUND OF THE INVENTION

This invention relates to modular electronic equipment having the modules mounted to a backplane and more particularly to such a system which permits the modules to be flexibly interconnected without requiring rewiring of the backplane.

FIELD OF THE INVENTION

Many types of electronic equipment are designed to have a plurality of circuit modules, such as printed circuit boards, plugged into a prewired backplane or mother board. The backplane may for example be wired so that all of the modules are connected to a single system bus, the wiring may interconnect the modules in daisy chain fashion, or the modules may be interconnected in some other predetermined configuration.

A backplane system such as that described above works well so long as the equipment is being used to perform only a single function, and only a single type of module is being used. However, there are applications where it may be desired to utilize the same equipment or system in different modes or configurations or to perform different functions. For example, a basic piece of equipment may be designed to operate with a number of different computer systems and may require slightly different modules or different interconnections of modules depending on the computer system with which it is interfaced. Similarly, it may be desirable to interface a particular type of equipment to a number of different communications protocols (i.e., Ethernet, token-passing, etc.) which may require slight variations in modules or interconnections.

While some flexible backplane systems exist, these systems have only limited flexibility, and in particular have been limited to a particular type of interconnection between modules. Thus, while such a system might permit the length of the bus in a system to be varied, it does not permit the system to be reconfigured from a bus to a daisy chain configuration, to a loop back mode or the like.

Another limitation with existing flexible systems is that they respond only to the particular module or modules inserted in the system and thus are capable of operating in only a single mode for a given combination of modules. This further limits the flexibility in use of such systems.

Thus, a need exists for an improved flexible modular backplane interconnect system which permits far greater flexibility in the manner in which modules may be connected or interconnected and in the modules which may be used in the system, while still remaining relatively simple and inexpensive.

SUMMARY OF THE INVENTION

A flexible modular interconnect system is provided which utilizes a backplane having a plurality of module receiving slots and a plurality of circuit modules, selected ones of the circuit modules being mounted in at least selected ones of the slots. Each of the modules has a predetermined module logic which may vary from module to module so that the modules may be of one or more different types. A first and a second switch means are provided for each circuit module, each of which switch means is settable to at least two different states. For one embodiment of the invention, the switch means have a plurality of switch elements which are independently settable. Selected lines from each module logic are connected to the first switch means for the module and other selected lines from the module logic are connected to the second switch means for the module. The first and second switch means for a module are also interconnected and the first switch means for selected modules are connected to second switch means for adjacent modules. Selected information concerning each module is provided to each adjacent module and a control means is provided which is responsive at least in part to the received information concerning the adjacent modules for controlling the state of the switch means for a module which switch means is connected to such adjacent module. The state of the switch means controls the interconnections for the module logic lines connected thereto. Thus, by selectively controlling the state of the switch means, the modules may be flexibly interconnected. In addition to being responsive to information concerning adjacent modules, the control means may also operate in response to external controls, such as manual inputs from the user or control signals obtained from an external processor or other control device, further enhancing the flexibility of the system. While the switch means and the control means may be mounted on the backplane, the flexibility of the system is enhanced by having these elements mounted on each module. Each module receiving slot may have a plurality of first contacts and a plurality of second contacts, some of the first and second contacts being connected to the control means and the remaining first and second contacts being connected respectively to the first and second switch means.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
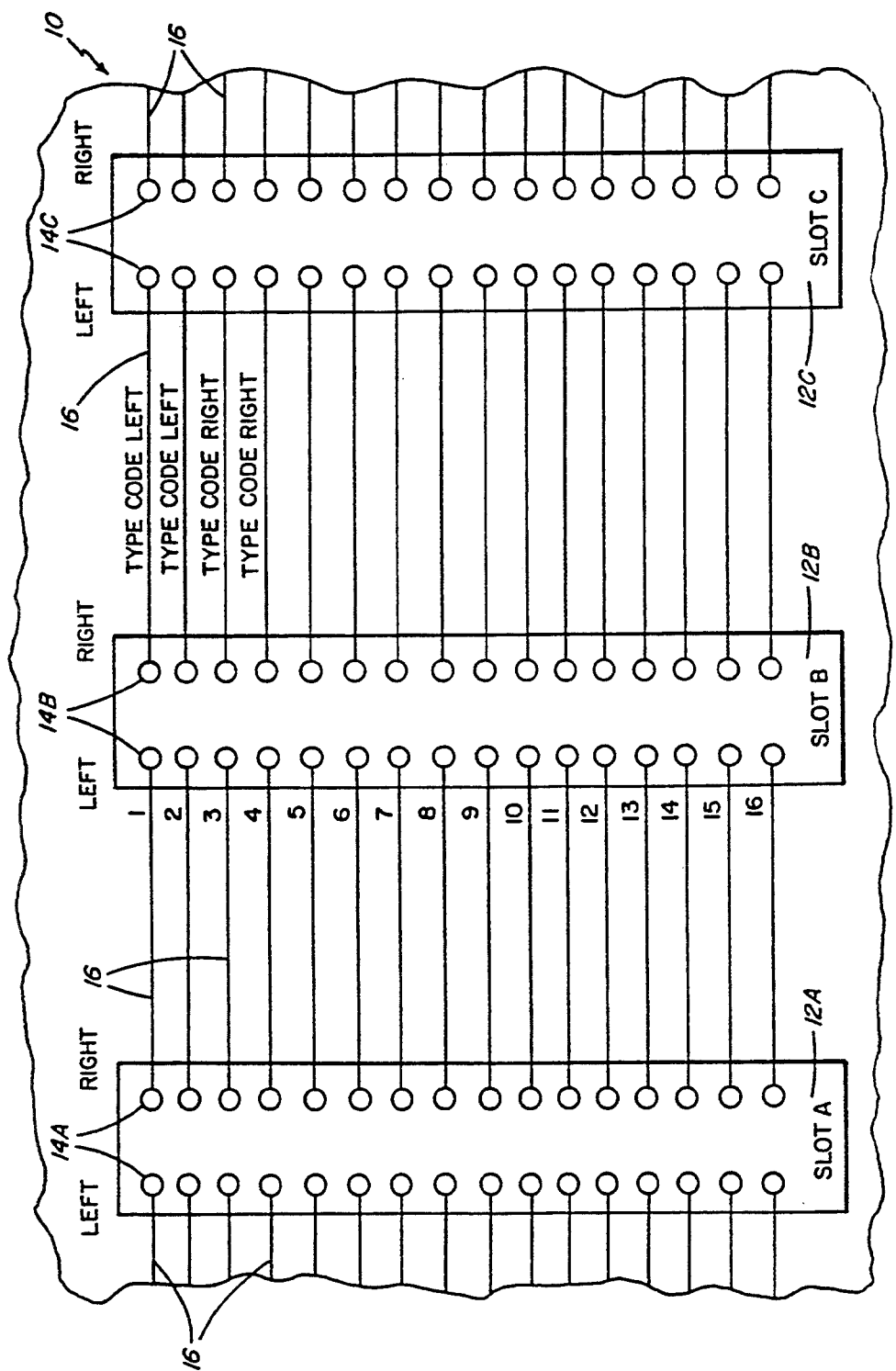
FIG. 1 is a diagram illustrating three adjacent module receiving slots in a backplane in accordance with the teachings of this invention.

Referring first to FIG. 1, and in accordance with this invention, a backplane 10 is provided having a plurality of module receiving slots 12 formed therein. Each slot 12 has a plurality of pins 14 which pins are divided into a left group of pins and a right group of pins. For the preferred embodiment there are a total of thirty-two pins for each slot with sixteen of the pins being left pins and sixteen of the pins being right pins. The right pin of each slot is connected to the corresponding left pin of the adjacent slot by a line 16. Thus, right pin number 1 of slot 12A is connected to left pin number 1 of slot 12B, right pin number 2 of slot 12A is connected to left pin number 2 of slot 12B, etc. The first two of the lines 16 interconnecting each pair of slots 12 contain type code information for the module in the left one of the two interconnected slots. Similarly, the third and fourth lines interconnecting each two adjacent slots contain a coded indication of module type for the module in the right one of the two slots. Thus, in FIG. 1, the first two lines interconnecting slots 12A and 12B would contain two-bit coded information concerning module type for the module in slot A, while the third and fourth lines would contain coded module type information for the module in slot 12B. If more than four module types are employed, a greater number of lines can be allocated for this function. Alternatively, the same two or more lines may be time shared to pass coded information concerning both modules, or the module type code may be serially transmitted from each module over a single line. Different module types could, for example, be utilized to interface the system to different computers or for use with different communication protocols. The remaining twelve lines interconnecting each pair of adjacent slots contain data, programming, or other information to be passed between or through the interconnected modules.

While only three slots are shown in FIG. 1, it is apparent that, for most electronic devices, there would be a much larger number of module receiving slots on backplane 10 and that these slots do not necessarily need to be arranged in a single row as shown in FIG. 1, but could be arranged in a matrix or in any other desired configuration.

Figure 2:
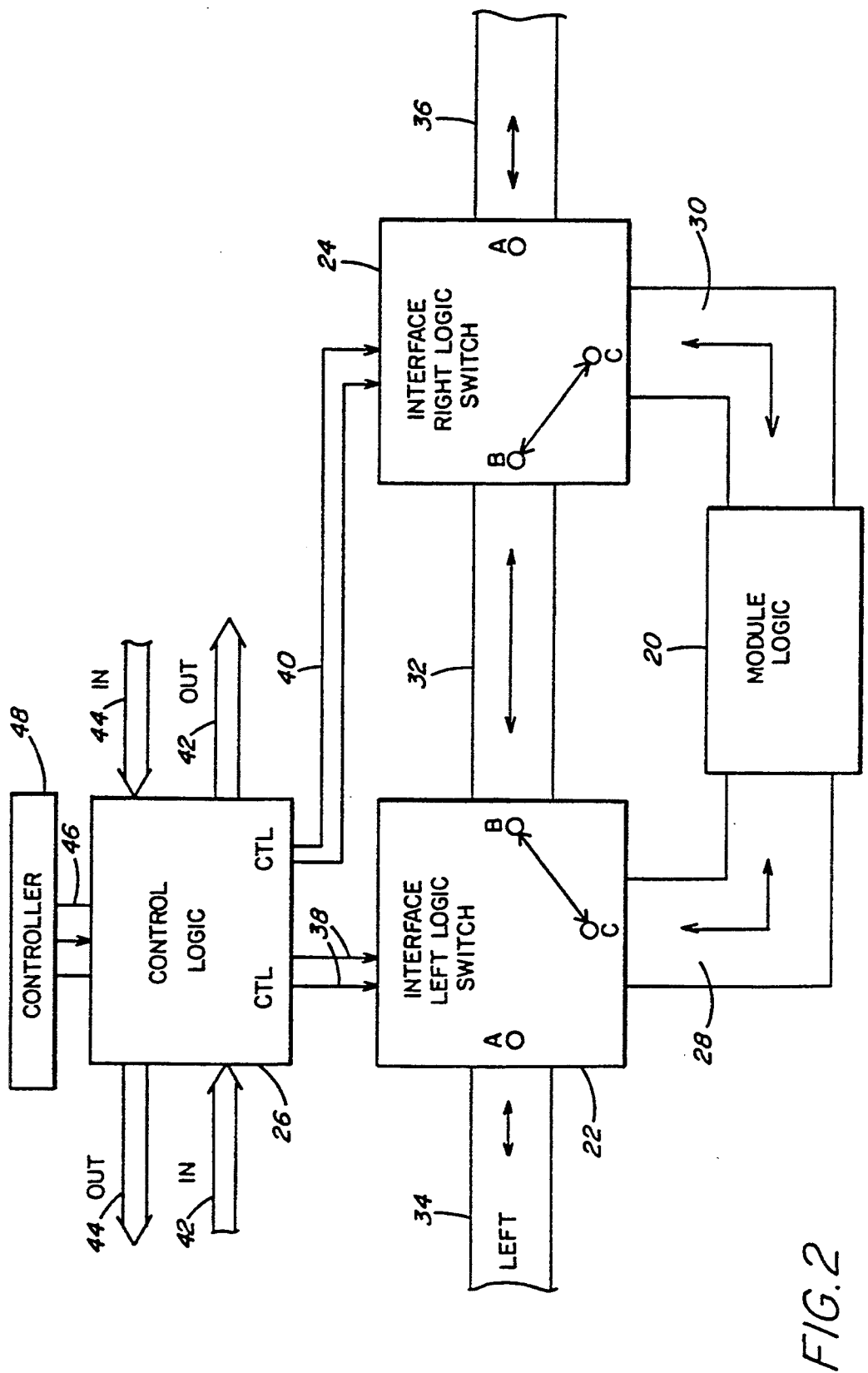
FIG. 2 is a schematic diagram illustrating a single module in accordance with the teachings of this invention connected in a looped back mode.

FIG. 2 illustrates the elements on a single module for a preferred embodiment. Referring to this figure, the module includes module logic 20, an interface left logic switch 22, an interface right logic switch 24, and control logic 26. Module logic 20 may be any circuitry, including hardware and/or software, usable on an electronic circuit module and the exact nature of this logic and circuitry does not form part of the present invention. Module logic 20 has a first group of input/output lines 28 which are connected as one input to left logic switch 22 (i.e., to the C input thereof) and a second group of input/output lines 30 which are connected to the C input of right logic switch 24. While the number of lines 28 and 30 may be equal, this is not a limitation on the invention. The B contact of the logic switches 22 and 24 are interconnected by lines 32. There are also a plurality of left function input/output lines 34 connected to the A contact of left logic switch 22 and a plurality of input/output lines 36 connected to the A contact of right logic switch 36. As will be discussed in greater detail later, switches 22 and 24 may be independently connected in any of a variety of configurations, the configuration or state of switches 22 and 24 at any given time being determined by control signals on lines 38 and 40 respectively from control logic 26. The signals on lines 38 and 40 may either be continuous to maintain the corresponding logic switch in a desired state or, preferably, the switches are set to a desired state by a coded input on the corresponding lines 38 or 40 and remain in such state until a new control input is received.

Each interface logic switch may be a mechanically controlled switch such as a relay, but is preferably an electronic switch of standard configuration formed utilizing, for example, three separate switch chips, e.g., DM44LS244 TriState sold by National Semiconductor Corp., Santa Clara, Calif.

Control logic 26 may operate in response to two different types of inputs. First, each control logic 26 receives type code inputs from the module in the slot to the left thereof on lines 42In. Lines 42 are the first two of the lines 16 interconnecting each two adjacent module slots 12 (FIG. 1). Control logic 26 also generates an output on lines 42Out which lines contain the type code of the module which is to be passed on to the control logic 26 of the next module to the right. Similarly, the control logic 26 receives inputs on lines 44In which contain the type code for the module in the slot 12 to the right thereof, and the control logic generates a type code output on the lines 44Out, providing its type code to the module to the left thereof. The code on lines 42Out and 44Out should be the same code. Normally the inputs on lines 42In and/or 44In will control the outputs on control lines 38 and 40 from the control logic, and will thus determine the state for switches 22 and 24. Whether it is the input on 42In, the input on 44In, or a combination of both which determine the outputs on lines 38 and 40 will depend on the nature of the module itself and will vary with application.

In addition to the inputs on lines 42 and 44, it is also possible for control logic 26 to receive an input on lines 46 from an external control device such as a microcomputer or other controller 48. The inputs on lines 46 may also reflect a user generated input which may be applied either directly from a user input device or through a controller 48. Controller 48 may be a microcomputer or some form of dedicated controller device associated with the particular system.

Control logic 26 may be special purpose logic which is hard wired to perform the specific logic function, may be a programmable logic array which is programmed to perform the desired logic function, may be a ROM decoder which, in response to a predetermined set of inputs on the lines 42In, 44In and 46 generates predetermined outputs on lines 38 and 40, or could be some other form of programmable logic device which generates predetermined outputs in response to a predetermined combination of inputs. While the function of control logic 26 is critical to the operation of the invention, the exact logical function performed by this circuit will vary with module and application and the specific hardware/software used for this application do not form part of the present invention.

The setting of switches 22 and 24 determine the mode in which the module operates. In FIG. 2, the circuit is shown connected in a "looped back" mode wherein information outputted on a line or lines 28 or 30 is fed back through the corresponding logic switch 22 or 24, lines 32 and the other logic switch and line back into the module 20. The module thus performs an independent function and does not interact with other modules in the system. Such a module may for example be a module which displays a time varying value with the logic for generating and displaying such value being within module logic 20 for such module.

Figure 3:
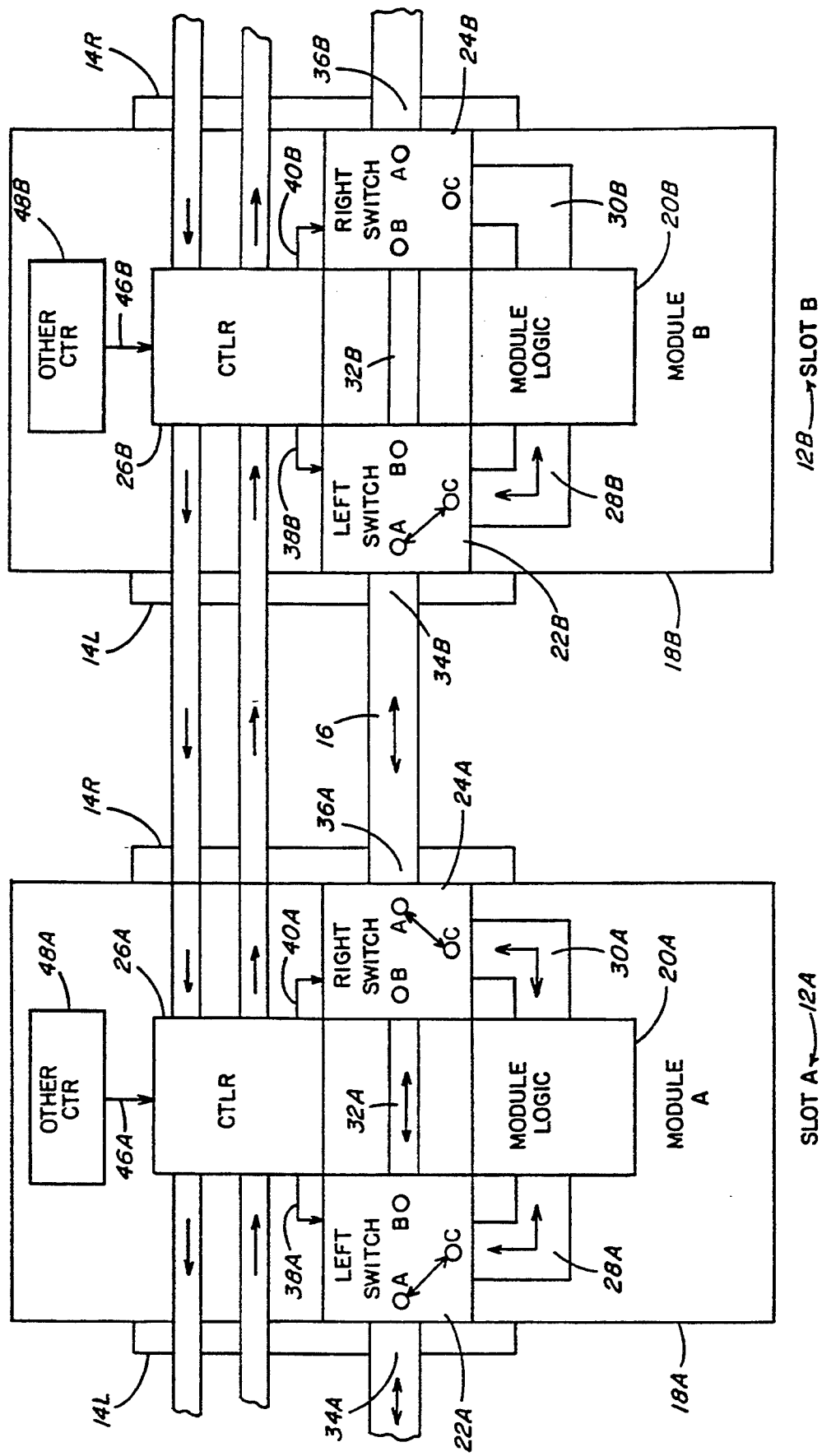
FIG. 3 is a schematic diagram illustrating two adjacent modules connected in a daisy chain mode which terminates at the B module.

FIG. 3 shows a pair of modules 18A and 18B, each of which is in a corresponding slot 12A and 12B. Each of the modules is shown as containing module logic 20, a left switch 22, a right switch 24, and a control logic 26.

An external control 48 is also shown for each module 18; however, for some embodiments of the invention, a single external control may be utilized as the external control 48 for all of the modules 18. The two modules 18A and 18B are interconnected in the manner previously described with the A contacts of right switch 24A for module 18A being connected through function lines 16 to the contact or terminal A of left switch 22B for module B. Left switch 22A may also have its A contacts connected to the right switch 24 of a next adjacent module 18 through lines 34A leading therefrom. However, for reasons which will be discussed shortly, the A contact of right switch 24B would probably not be connected to another module.

Modules A and B are connected as part of a daisy chain configuration which chain ends at module 18B. Thus, information received over line 34A is passed through the A contact of switch 22A to the C contact of this switch and through lines 28A to module logic 20A. The inputted information, either as received or as modified by module 20A is then applied through lines 30A to the C contact of right switch 24A. This contact is connected to the A contact of switch 24A which is connected through lines 36A and interconnected lines 16 to lines 34B leading to the A contacts of left switch 22B. This contact is connected to the C contact of the switch which passes the signal through lines 28B to module logic 20B. However, since right switch 24B is open (i.e., there are no connections within this switch), information cannot be passed from module logic 20B on to a next-right adjacent module. The daisy chain therefore ends at module 18B. However, module logic 20B may send information back through lines 28B, switch 22B, lines 34B, 16, 36A, switch 24A and lines 30A to module logic 20A. Module logic 20A may then either elect to send information back through the same path to module logic 20B, to pass the information from module logic 20B through unaltered to the next left module in the chain, to perform various logic functions on this input before passing it on to the next left module to merely utilize the received input or to perform some other function with it. FIG. 3 thus illustrates a daisy chain mode of operation and also illustrates the fact that, while in most applications the left switch 22 and the right switch 24 for a given module will be in the same state, this is not always the case.

Figure 4:
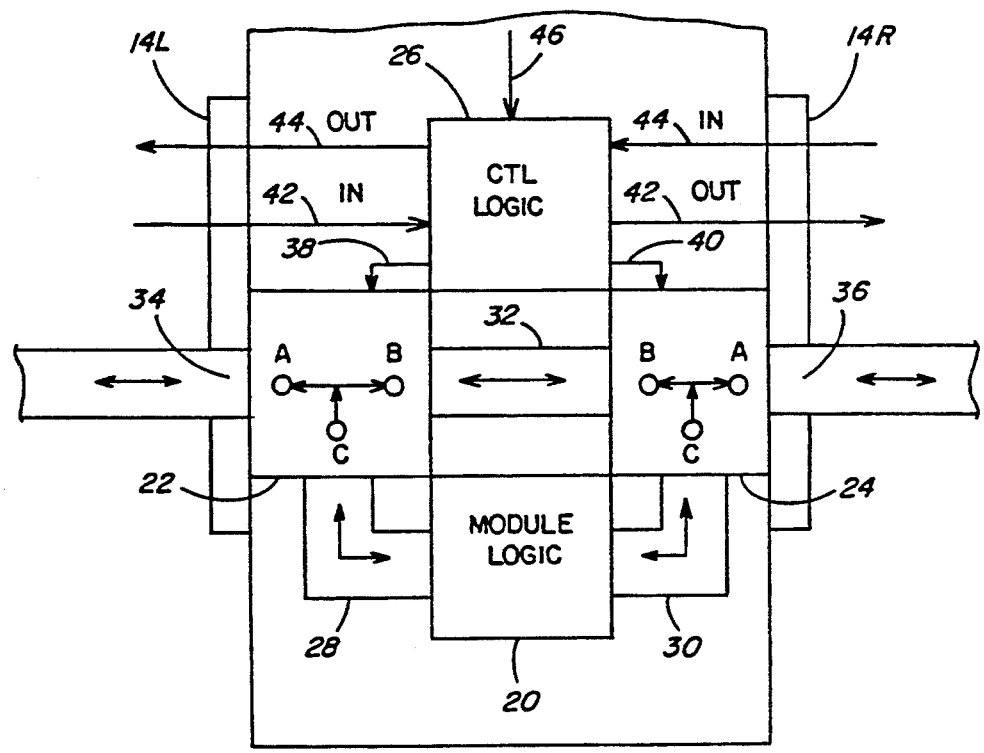
FIG. 4 is a partial schematic diagram of a single module connected in the attached bus mode.
Figure 5:
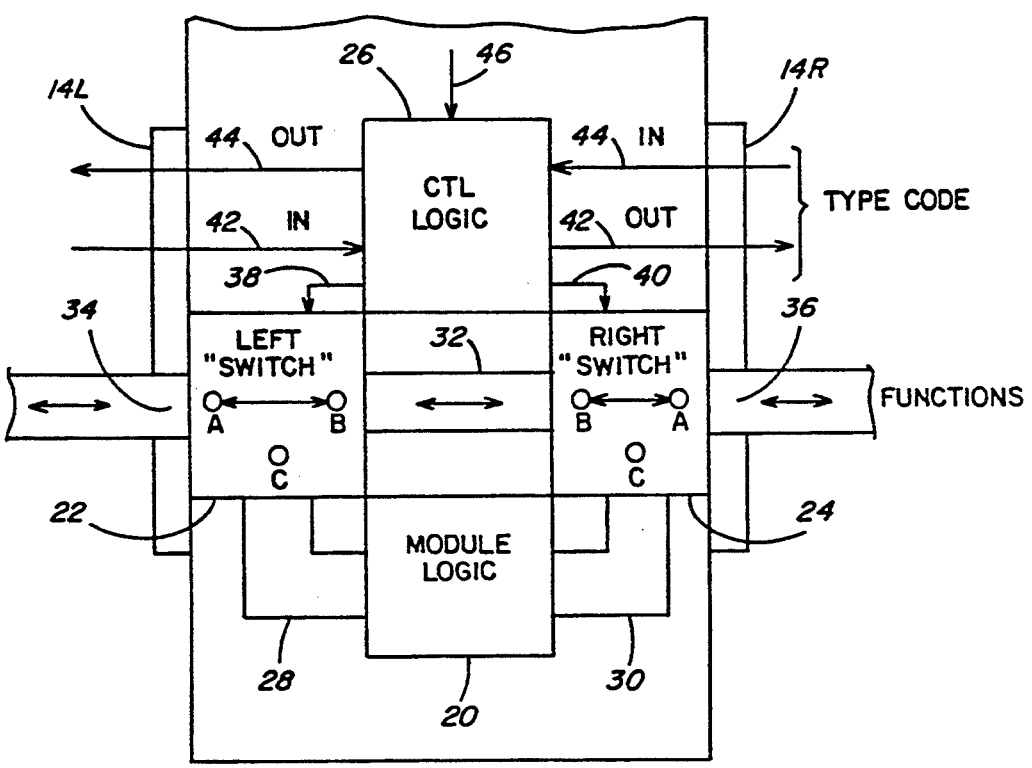
FIG. 5 is a partial schematic diagram of a single module connected in the bypass mode.

FIGS. 4 and 5 illustrate two additional modes in which the modules of this invention may be connected or interconnected. In FIG. 4, the terminals A, B and C of each of the switches 22 and 24 are interconnected so that, depending on the condition of the module logic, information received at a terminal A for one of the switches may either bypass the module logic 20, passing through the switches and through the lines 32 interconnecting the switches, may pass through the module logic 20 without being applied to the lines 32 as for the daisy chain operation described previously in conjunction with FIG. 3, or may do both, with the information being applied to module logic 20 and also passing through lines 32 to the next module in the chain. An example of this type of operation might be a token ring system where, when a token is transmitted on the line, the token passes through lines 32 if there is no message at module 20 to be transmitted, but is captured by the module logic and not passed through lines 32 when the module logic has a message to transmit. Having captured the token, the module logic then puts a message through for example lines 30 and switch 24 to lines 36 leading to the next module. The token is then put on the end of the message. The next module in the chain passes the message down the chain, but might capture the token portion of the message if it has a message to transmit. A module may also elect to receive a message if the message is addressed to the module.

FIG. 5 illustrates the bypass mode wherein the particular module logic is not active in the circuit. For this mode, contacts A and B on each of switches 22 and 24 are interconnected causing information received at either switch to be passed through the lines 32 and the other of the switches to the next adjacent module.

In the discussion so far, it has been assumed that all of the lines connected to a given switch are treated in the same fashion. However, as illustrated by FIG. 6, this is not a limitation on the invention.

Figure 6:
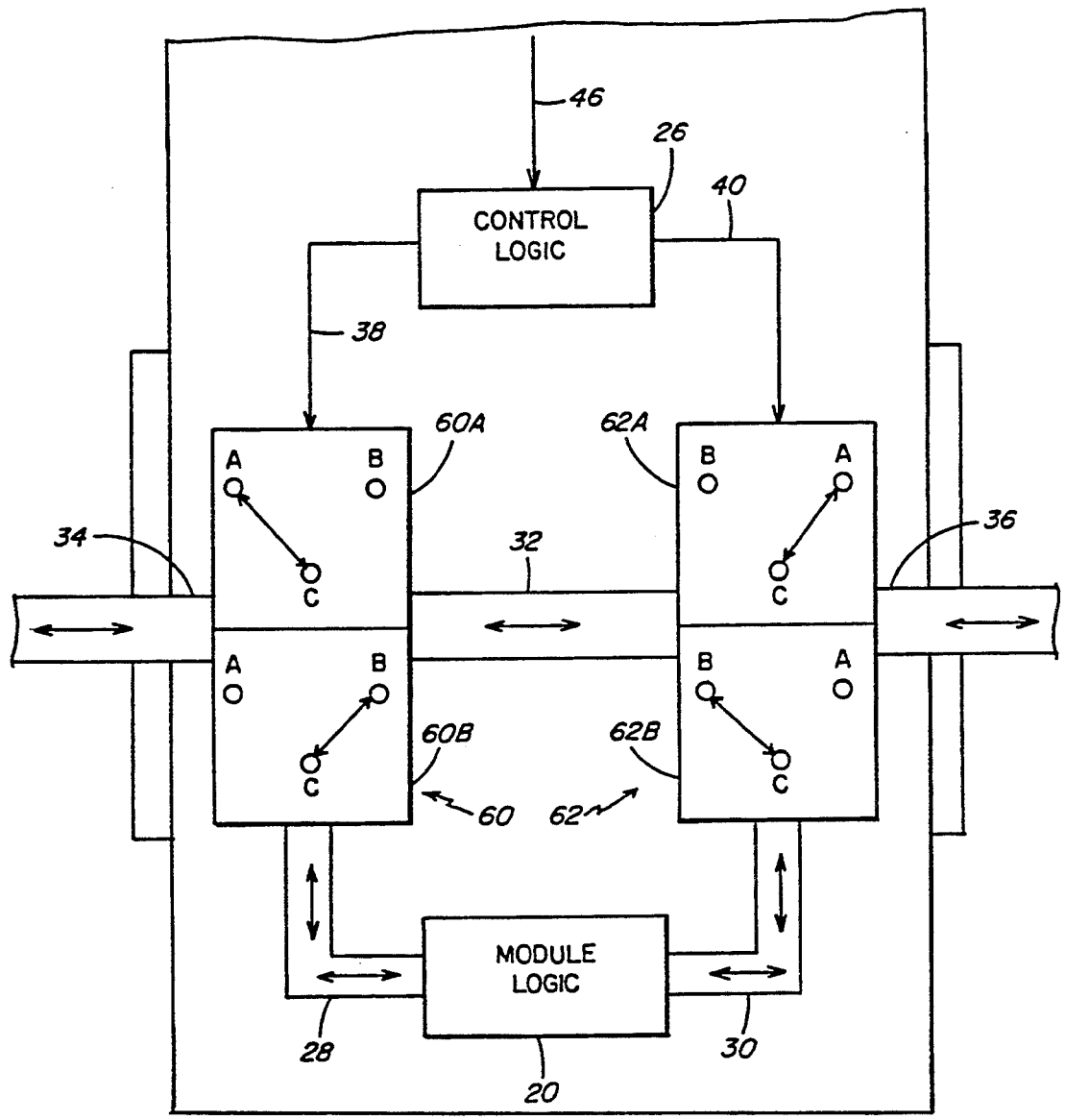
FIG. 6 is a partial schematic diagram of a single module for an alternative embodiment of the invention wherein part of the module is connected in the daisy chain mode and part in the looped back mode.

Referring to FIG. 6, it is seen that the left interface logic switch 60 has two parts 60A and 60B and the right interface logic switch has two parts 62A and 62B. Some of the lines 28 from module logic 20 are connected to switch logic 60A and some of the lines 28 are connected to switch 60B. Similarly, some of the lines 30 from module logic 20 are connected to switch 62A and some of these lines are connected to switch 62B. Control lines 38 from control logic 26 are adapted to independently control switches 60A and 60B such that these switches may be connected in different modes. Thus, as shown in the figure, switches 60A may for example be connected in a daisy chain mode while switches 60B are connected in a loop back mode. Control lines 40 are similarly adapted to independently control switches 62A and 62B. Thus, portions of module logic 20 may operate in one mode, such as a loop mode back mode, while the remaining portions of this circuit are operated in a different mode, for example, a daisy chain mode. Obviously the two portions of the circuit operating in different modes may communicate with each other in the module logic itself. While two independently controllable switch elements are shown for each switch logic in FIG. 6, it is apparent that three or more such elements could be provided for one or more of the switches for a given application.

Similarly, while all of the switch connections are shown as being bidirectional in the figures, the direction of switch connection could be independently controlled for each connection so that, for example, in FIG. 3 signals could flow to the right through the daisy chain, but not to the left. It is also possible for all of the connections to be monodirectional. Further, while for the preferred embodiments, switch settings are determined at least in part by signals on lines 42 and 44 from adjacent modules, this is not a limitation on the invention and it is possible that the switch control could be solely from the external source of that control could be achieved in some other way.

While in the discussion above, switches 22 and 24, and control logic 26 have all been positioned on module 18, and this is preferable because of the enhanced flexibility it provides, with suitable modification, one or more of these elements could be on the backplane 10 for each slot 12. Further, while various switch setting and modes of operation have been discussed above, it is to be understood that such examples are not exhaustive, and that other settings or combinations of settings are possible to establish different system operating modes. In addition, while the invention has been shown above with respect to preferred embodiments, it is apparent that variations could be made in the specific logic components used and in their interconnection while still retaining the desired flexibility. Thus, while the invention has been particularly shown and described above with respect to preferred embodiments, the foregoing and other changes in form and detail may be made therein by one skilled in the art without departing from the spirit and the scope of the invention.

What is claimed is:

1. A module interconnect system comprising:
   a backplane having a plurality of module-receiving slots and means for interconnecting said module-receiving slots; and
   two or more modules mounted in selected ones of said module-receiving slots, at least one of said modules comprising:
   a module circuit having a first group of module circuit lines and a second group of module circuit lines;
   a first group of module I/O lines for connecting said module to a first adjacent module through said backplane;
   a second group of module I/O lines for connecting said module to a second adjacent module through said backplane; and
   a switching mechanism selectably connecting said first group of module circuit lines to neither, one or both of said groups of module I/O lines and for selectably connecting said second group of module circuit lines to neither, one or both of said groups of module I/O lines, said switching mechanism being responsive to a control signal representative of a desired interconnection between said module circuit and said first and second adjacent modules.

2. A module interconnect system as defined in claim 1 wherein said switching mechanism further includes means for selectably connecting said first group of module circuit lines to said second group of module circuit lines in response to said control signal.

3. A module interconnect system as defined in claim 1 wherein said switching mechanism comprises:
   a first switch for selectably connecting said first group of module circuit lines to said first group of module I/O lines,
   a second switch for selectably connecting said second group of module circuit lines to said second group of module I/O lines, and
   a control mechanism generating said control signal for controlling the operation of said first and second switches.

4. A module interconnect system as defined in claim 3 wherein said first and second switches include means for selectably connecting said first group of module circuit lines to said second group of module circuit lines.

5. A module interconnect system as defined in claim 4 wherein said control signal is generated in response to information representative of the module type of said first and second adjacent modules.

6. A module interconnect system as defined in claim 4 wherein said control mechanism receives information from an external source regarding the desired interconnection.

7. A module interconnect system comprising:
   a backplane having a plurality of module-receiving slots and means for interconnecting said module-receiving slots; and
   two or more modules mounted in selected ones of said module-receiving slots, at least one of said modules comprising:
   a module circuit having a first group of module circuit lines and a second group of module circuit lines;
   a first group of module I/O lines for connecting said module to a first adjacent module through said backplane;
   a second group of module I/O lines for connecting said module to a second adjacent module through said backplane; and
   a switching mechanism responsive to a control signal and selectably connecting said first group of module I/O lines to said first group of module circuit lines, to said second group of module I/O lines, to neither or to both, and for selectably connecting said second group of module I/O lines to said second group of module circuit lines, to said first group of module I/O lines, to neither or to both, and a control mechanism generating and transmitting to the switching mechanism the control signal that represents a desired interconnection between said first and second groups of module I/O lines and said first and second groups of module circuit lines.

8. A module interconnect system as defined in claim 7 wherein said control signal is generated in response to information representative of the module type of said first and second adjacent modules.

9. A module interconnect system as defined in claim 7 wherein said control mechanism receives information from an external source regarding the desired interconnection.

10. A method for interconnecting a module to first and second adjacent modules through a backplane in which the circuit modules are mounted, said module including a module circuit having a first group of module circuit lines and a second group of module circuit lines, the method comprising the steps of:
    providing a first group of module I/O lines for connecting said module to said first adjacent module through said backplane and a second group of module I/O lines for connecting said module to said second adjacent module through said backplane;
    electronically interconnecting said first group of module I/O lines to said first group of module circuit lines and said second group of module I/O lines to said second group of module circuit lines when a control signal is representative of a series connection of said module to said first and second adjacent modules; and
    electronically interconnecting said first group of module circuit lines to said second group of module circuit lines when said control signal is representative of a loopback connection of said module.

11. A method as defined in claim 10 further including the step of electronically interconnecting said first group of module I/O lines to said second group of module I/O lines when said control signal is representative of a bypass connection of said module.

12. A method as defined in claim 10 further including the step of electronically interconnecting said first and second groups of module I/O lines and said first and second groups of module circuit lines when said control signal is representative of a bus connection of said module.

13. A method as defined in claim 10 further including the step of providing said control signal to said module from an external source.

14. A method as defined in claim 10 further including the step of generating said control signal in response to information representative of the module type of said first and second adjacent modules.

15. A module interconnect system comprising:
- a backplane having a plurality of module-receiving slots and means for interconnecting said module-receiving slots; and
- two or more modules mounted in selected ones of said module-receiving slots, at least one of said modules including a module circuit having a first group of module circuit lines and a second group of module circuit lines;
- a first group of module I/O lines for connecting said module to a first adjacent module through said backplane;
- a second group of module I/O lines for connecting said module to a second adjacent module through said backplane;
- a switching mechanism responsive to a control signal for selectably connecting said first group of module circuit lines to neither, one or both of said groups of module I/O lines and for selectably connecting said second group of module circuit lines to neither, one or both of said groups of module I/O lines, in order to achieve a desired interconnection between said module and said first and second adjacent modules; and
- a control mechanism generating and transmitting to the switch, the control signal representative of the desired interconnection between said module and said first and second adjacent modules.

16. The module interconnect system as defined in claim 15, wherein the switching mechanism and control mechanism are positioned on said module.

17. A module interconnect system as defined in claim 15, wherein the control signal is generated in response to information representative of the module type of the first and second adjacent modules.

18. A module interconnect system as defined in claim 15, wherein the control signal is representative of a bypass connection of said at least one module.

19. A module interconnect system as defined in claim 15, wherein the control signal is representative of a bus connection of said at least one module.

20. A module interconnect system as defined in claim 15, wherein the control signal is representative of a series connection of said at least one module with respect to said first and second adjacent modules.

21. A module interconnect system as defined in claim 15, wherein the control signal is representative of a loop back connection of said at least one module.

* * * * *

UNITED STATES PATENT AND TRADEMARK OFFICE
CERTIFICATE OF CORRECTION

PATENT NO. : 5,349,343
DATED : September 20, 1994
INVENTOR(S) : Oliver

It is certified that error appears in the above-indentified patent and that said Letters Patent is hereby corrected as shown below:

Col. 6, line 54 - delete "of" and substitute --or--

Signed and Sealed this

Twenty-first Day of February, 1995

Attest:

BRUCE LEHMAN

Attesting Officer

Commissioner of Patents and Trademarks